March 1, 1938. S. A. KORNSWEET 2,109,539
AMUSEMENT DEVICE
Original Filed Oct. 10, 1934
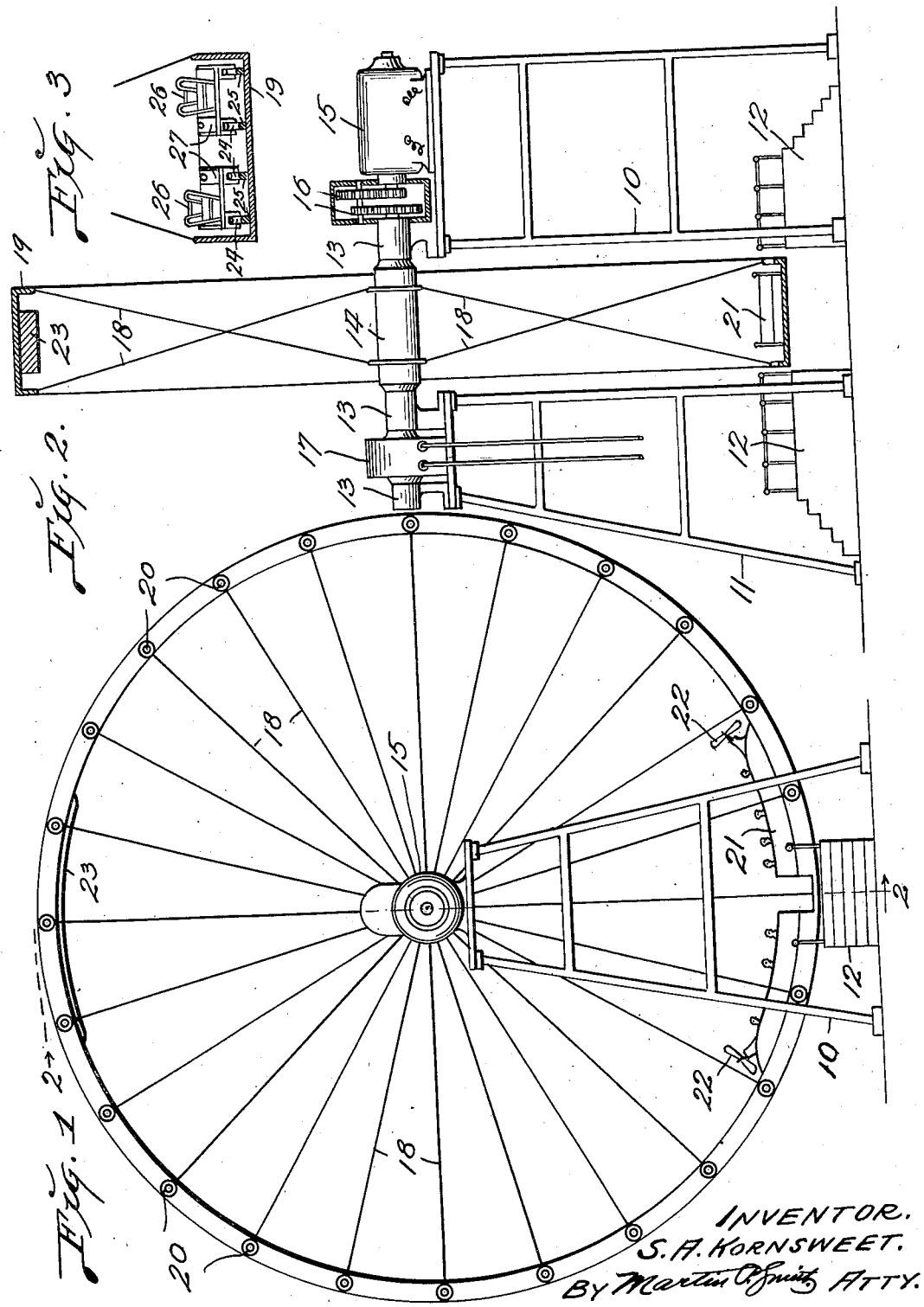

Patented Mar. 1, 1938

2,109,539

UNITED STATES PATENT OFFICE 2,109,539

AMUSEMENT DEVICE

Samuel A. Kornsweet, Venice, Calif., assignor of fifteen percent to Norman Leiman and Daniel Zampino, both of Los Angeles, Calif.

Application October 10, 1934, Serial No. 747,694
Renewed July 23, 1937

1 Claim. (Cl. 272—49)

My invention relates to an amusement device and has for its principal object, the provision of a large ring or wheel that is mounted for rotation on a horizontal axis and mounted on the inside of the rim of the wheel or ring is a car or cars adapted to be occupied by passengers or amusement seekers and which car or cars are carried upward, first, in one direction and then in the other as the shaft of the ring or wheel is rocked and when the shaft is rotated, the passenger carrying cars will make a complete circle.

A further object of my invention is, to provide an attractive amusement device for public or private parks, also for beaches or wherever persons congregate for pleasure or pastime.

A further object of my invention is, to provide an amusement device that may be driven by an electric motor and the shaft that carries the wheel or ring having associated therewith a hydraulic brake for controlling the rotation of the shaft.

With the foregoing and other objects in view my invention consists in certain novel features of construction and arrangements of parts that will be hereinafter more fully described and claimed and illustrated in the accompanying drawing in which:

Fig. 1 is a side elevational view of an amusement device constructed in accordance with my invention.

Fig. 2 is a vertical section taken on the line 2—2 of Fig. 1.

Fig. 3 is a detail section showing a modified form of the cars that are occupied by the passengers or persons using the amusement device.

Referring by numerals to the accompanying drawing which illustrates a preferred embodiment of my invention, 10 and 11 designate upright frames preferably constructed of metal and said frames being spaced a sufficient distance apart to accommodate the ring or wheel in which the passenger carrying car or cars are mounted.

Suitable loading and unloading platforms 12 are constructed on the ground within the lower portions of the upright frames 10 and 11, said platforms being located on opposite sides of the space that is occupied by the ring or wheel.

Journaled in suitable antifriction bearings 13, that are mounted on the tops of the frames 10 and 11, is a shaft 14, and an electric motor 15 mounted on top of upright frame 10 is connected by suitable reduction gearing 16 to one end of said shaft.

Mounted on top of frame 11, between the bearings 13 thereon, is a hydraulic brake 17 of conventional form and which is used for stopping and for controlling the speed of shaft 14.

Connected to shaft 14, are the inner ends of radially disposed rods 18 that function as spokes and in order to increase the strength of the wheel structure, these spokes may be crossed after the manner of the spokes of a bicycle wheel. The outer ends of the spokes are connected to a large ring 19, formed of metal and which ring is substantially channel-shape in cross section.

The outer faces of this ring may be suitably decorated and in order to increase the attractiveness of the device at night, the outer side faces of the ring may carry electric lights 20.

The diameter of this ring is such that its lower portion occupies a position between the upper portions of the landing platforms 12, as illustrated in Fig. 2.

Secured within the ring is an open car or cars such as 21 for the accommodation of passengers and arranged at the ends of the car are propeller wheels 22 similar to the propellers used on aircraft.

Secured within the ring 19, at a point diametrically opposite the car 21, is a weight 23 that counterbalances the weight of the car 21 and the passengers carried thereby (see Fig. 3). Where the cars are mounted to travel on tracks inside the wheels as illustrated in Fig. 3, a counterbalance is not employed.

In some instances the car or cars are provided with grooved wheels 24 that engage rails 25 that are secured to the inside of the ring 19, thus enabling the cars to travel backwardly or forwardly upon the rails independently of the rotary movement of the wheel.

The seats for the passengers may be equipped with suitable straps arranged to form a harness 26 that passes over the shoulders and around the bodies of the occupants of the seats so as to prevent the passengers from falling from the seats when the car is at the top of the ring.

Each seat may be provided with a small box such as 27 and said box having a lock, thus enabling the passengers to place their valuables and the like in the boxes so as to insure the safety thereof while using the amusement device.

In the operation of the amusement device, the motor 15 is started and through gearing 16 the shaft 14 carrying the ring 19 will be rotated.

The ring may be partially rotated first in one direction and then in the other, thus carrying the passenger cars upwardly from the loading platform first in one direction and then in the other so as to impart a rocking movement to said cars and finally the motor may be operated so as to completely rotate the wheel so that the passenger carrying cars make a complete revolution.

When the wheel is completely rotated, centrifugal force and the fact that the passengers are held in the car by straps or harness will prevent the passengers from dropping out of the cars when the latter are at the top of the wheel.

Through the use of the hydraulic brake 17, which cooperates with shaft 14, the partial or complete rotary motion imparted to the shaft by the motor may be very accurately controlled.

Where the passenger carrying cars are mounted to traverse tracks on the inner face of the ring, the latter may be slowly rotated in one direction and the passenger cars will by gravity move in the opposite direction or if the ring is rotated at considerable speed, the passenger cars will be carried upward so as to make a complete revolution with the ring and said cars will retain their positions within the ring while at the upper portion thereof through the action of centrifugal force.

The larger sizes of the amusement device may be built as permanent structures and the smaller sizes may be constructed so as to be mounted on trucks or skids so as to be moved from one point to another.

It will be understood that minor changes in the size, form and construction of the various parts of my improved amusement device may be made and substituted for those herein shown and described without departing from the spirit of my invention, the scope of which is set forth in the appended claim.

I claim as my invention:

An amusement device comprising a pair of spaced upright frames, loading and unloading platforms arranged within the lower portions of said frames, a shaft journalled in the upper portions of said frames, spokes extending laterally from said shaft, a ring secured to the outer ends of said spokes, which ring is channel shaped in cross section and when rotated, passes between the loading and unloading platforms, a passenger-carrying car secured to and arranged on the inner face of said ring, a counter-balancing weight secured to the inner face of said ring at a point diametrically opposite the passenger-carrying car, means for imparting rotary movement to said shaft and means for controlling the rotary movement imparted to said shaft.

SAMUEL A. KORNSWEET.